(12) United States Patent
Kraus et al.

(10) Patent No.: US 7,295,191 B2
(45) Date of Patent: Nov. 13, 2007

(54) METHOD AND SYSTEM FOR DETECTING MULTIPLE TOUCHES ON A TOUCH-SENSITIVE SCREEN

(75) Inventors: Mark Gerard Kraus, Redmond, WA (US); Vu Xuan Nguyen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 48 days.

(21) Appl. No.: 10/924,508

(22) Filed: Aug. 24, 2004

(65) Prior Publication Data

US 2005/0017959 A1    Jan. 27, 2005

Related U.S. Application Data

(62) Division of application No. 10/185,056, filed on Jun. 28, 2002, now Pat. No. 7,023,427.

(51) Int. Cl.
  *G06F 3/041* (2006.01)
  *G06F 3/042* (2006.01)
  *G06F 3/045* (2006.01)
  *G06K 11/06* (2006.01)
  *G08C 21/00* (2006.01)

(52) U.S. Cl. ............ 345/173; 345/174; 345/175; 178/18.01

(58) Field of Classification Search ........ 345/173, 345/174; 178/18.01, 19.05
  See application file for complete search history.

(56) References Cited

U.S. PATENT DOCUMENTS

| | | | |
|---|---|---|---|
| 4,819,194 A | 4/1989 | Koizumi et al. | |
| 4,929,934 A | 5/1990 | Ueda et al. | |
| 5,225,636 A | 7/1993 | Protheroe | |
| 5,241,139 A | 8/1993 | Gungl et al. | |
| 5,245,139 A | 9/1993 | Protheroe et al. | |
| 5,283,559 A | 2/1994 | Kalendra et al. | |
| 5,565,894 A | 10/1996 | Bates et al. | |
| 5,764,223 A | 6/1998 | Chang et al. | |
| 5,854,450 A * | 12/1998 | Kent | 178/18.04 |
| 5,896,126 A | 4/1999 | Shieh | |
| 5,956,020 A * | 9/1999 | D'Amico et al. | 345/173 |
| 6,181,328 B1 | 1/2001 | Shieh et al. | |

(Continued)

OTHER PUBLICATIONS

Bamdad Samii, "Cartesian Coordinate System, Distance and Midpoint Formula," 3 pages, 1997, retrieved from http://allchinfiles.com/cartesianexp.html on Aug. 12, 2004.

*Primary Examiner*—Sumati Lefkowitz
*Assistant Examiner*—Alexander S. Beck
(74) *Attorney, Agent, or Firm*—Lee & Hayes, PLLC

(57) ABSTRACT

Disclosed are a method and a system for detecting multiple, simultaneous touches on a touch-sensitive screen of a computing device. The hardware that controls the touch screen performs two measurements to locate a touch location on the screen. If there is a single touch, then the two measurements are equal. A non-zero difference indicates multiple touches and is correlated with the spread of locations simultaneously touched on the screen. If the difference is greater than a set threshold, then an indication is given of multiple touches. The user is warned against multiple touches, and input from the screen is ignored as long as multiple touches are detected. For some embodiments, when multiple touches are detected, the invention also tries to indicate the boundary of the set of locations simultaneously touched. The boundary is used to interpolate the intended single touch from the locations of all the touches.

20 Claims, 13 Drawing Sheets

U.S. PATENT DOCUMENTS

| | | | |
|---|---|---|---|
| 6,323,846 B1 * | 11/2001 | Westerman et al. | 345/173 |
| 6,353,193 B1 | 3/2002 | Atwood et al. | |
| 6,831,631 B2 * | 12/2004 | Chuang | 345/173 |
| 6,888,537 B2 | 5/2005 | Benson et al. | |
| 6,943,779 B2 * | 9/2005 | Satoh | 345/173 |
| 7,002,556 B2 * | 2/2006 | Tsukada et al. | 345/173 |
| 2002/0075243 A1 | 6/2002 | Newton | |
| 2003/0063073 A1 * | 4/2003 | Geaghan et al. | 345/173 |
| 2003/0071797 A1 | 4/2003 | Chang et al. | |
| 2003/0197689 A1 | 10/2003 | May | |
| 2003/0222857 A1 | 12/2003 | Abileah | |
| 2004/0001048 A1 | 1/2004 | Kraus et al. | |
| 2004/0140993 A1 | 7/2004 | Geaghan et al. | |
| 2004/0155871 A1 | 8/2004 | Perdki et al. | |
| 2005/0012724 A1 | 1/2005 | Kent | |
| 2005/0030291 A1 | 2/2005 | Yanagisawa | |
| 2005/0093845 A1 * | 5/2005 | Brooks et al. | 345/179 |
| 2005/0104867 A1 | 5/2005 | Westerman et al. | |
| 2005/0128190 A1 | 6/2005 | Ryynanen | |
| 2005/0253818 A1 | 11/2005 | Nettamo | |

* cited by examiner

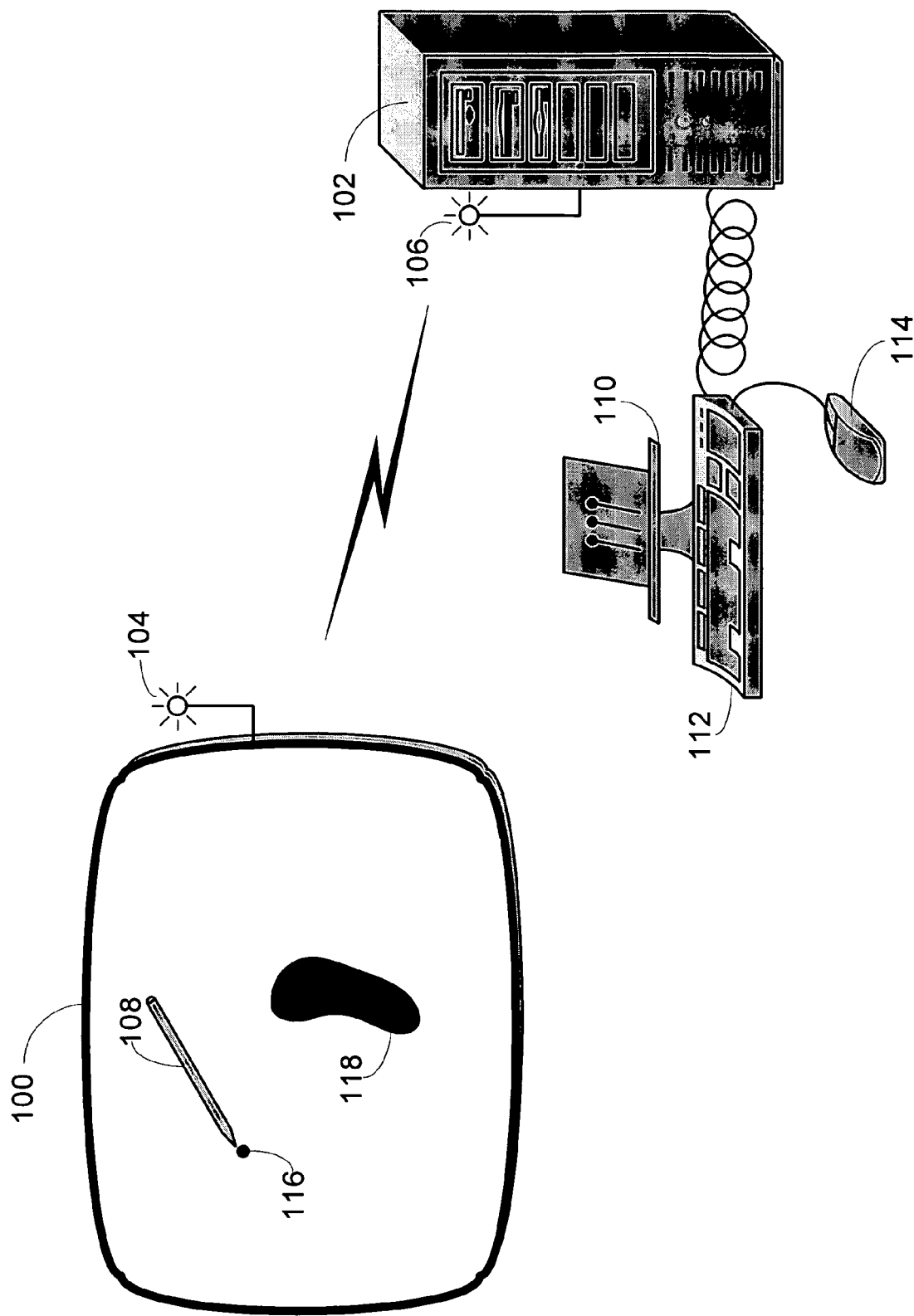

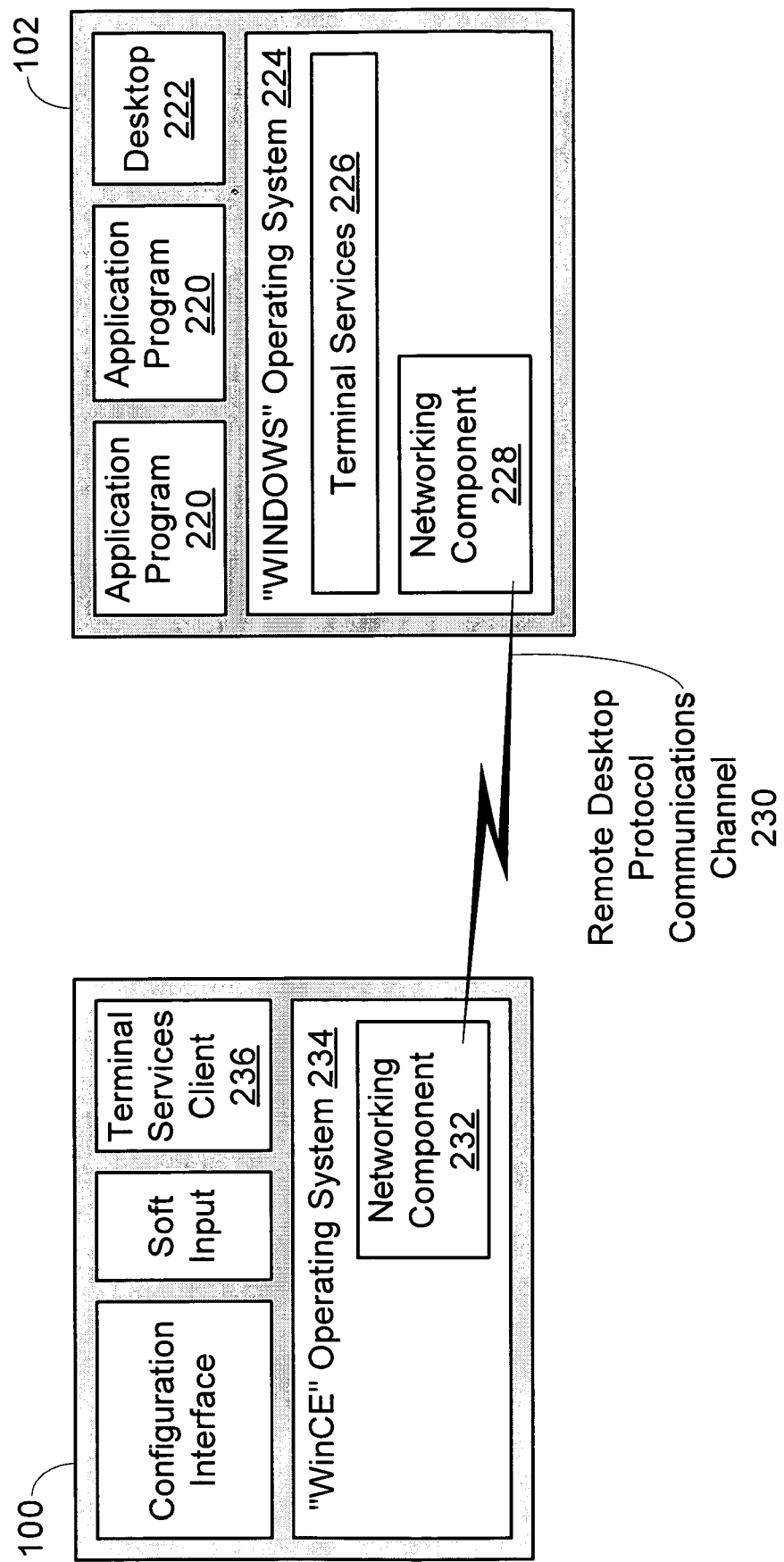

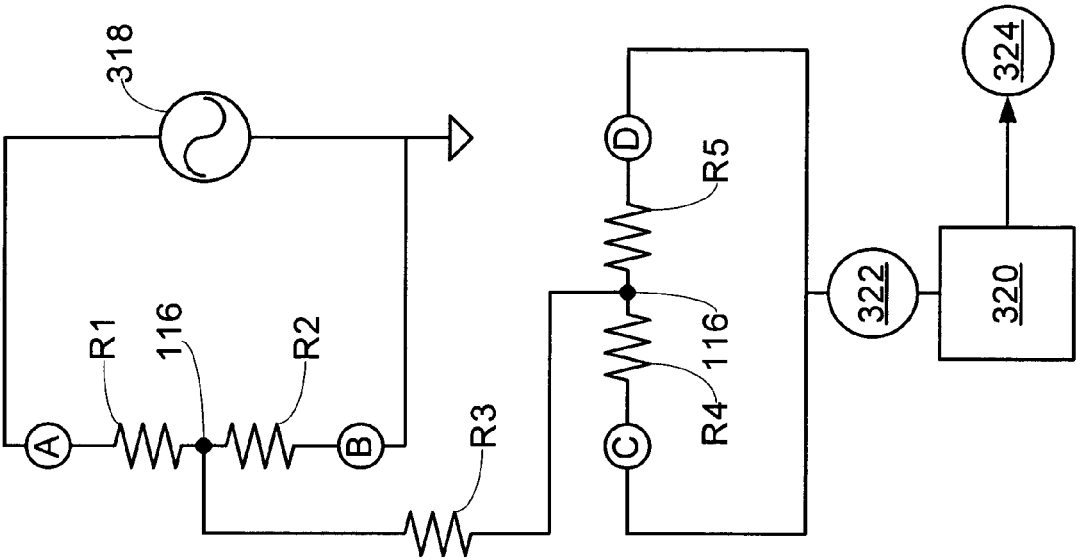
FIG. 3c Equivalent Electrical Circuit
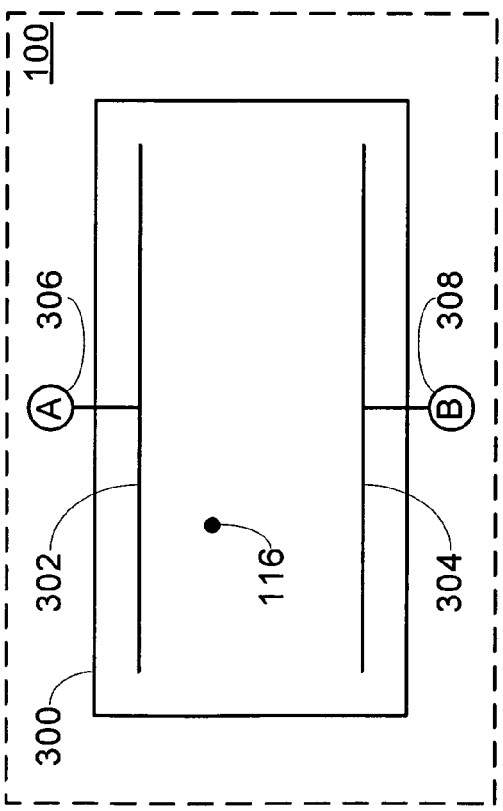
FIG. 3a First Touch-Screen Surface
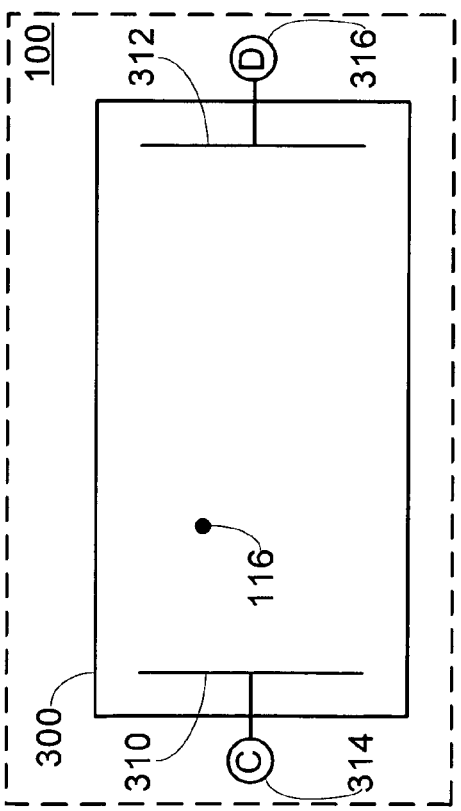
FIG. 3b Second Touch-Screen Surface

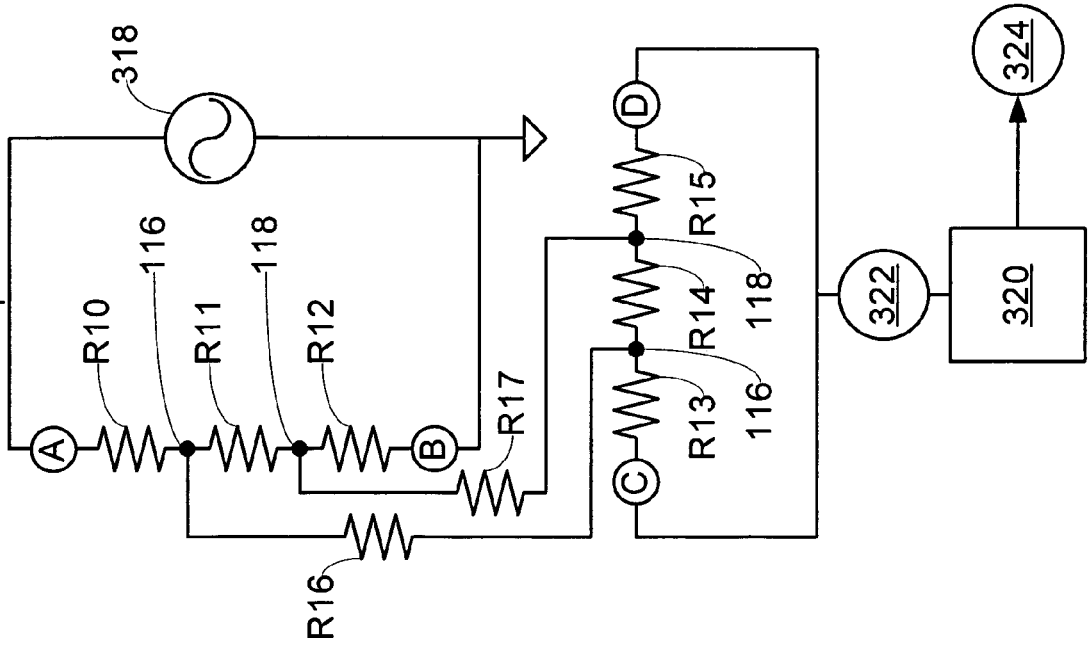
FIG. 4c Equivalent Electrical Circuit
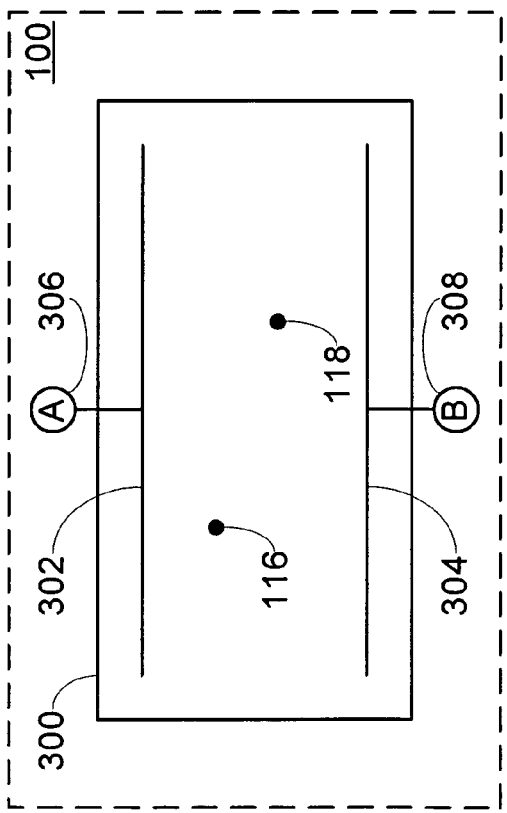
FIG. 4a First Touch-Screen Surface
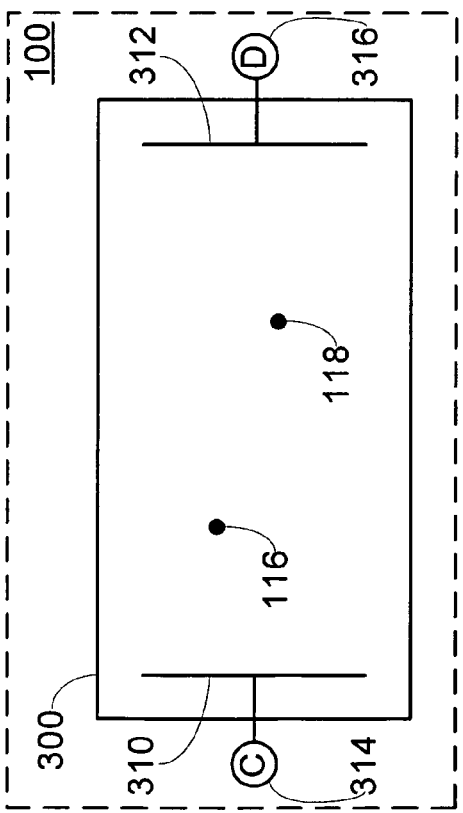
FIG. 4b Second Touch-Screen Surface

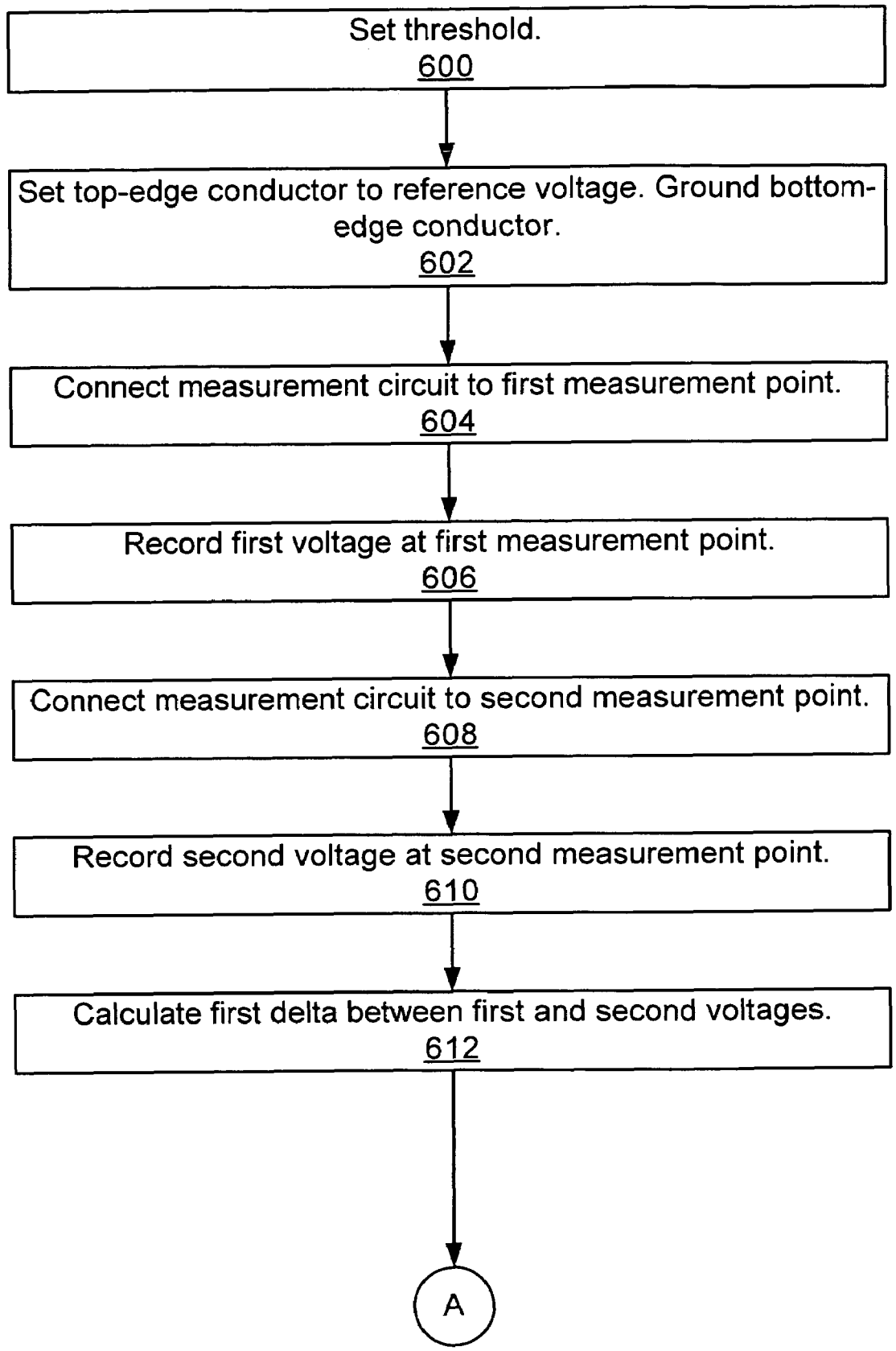

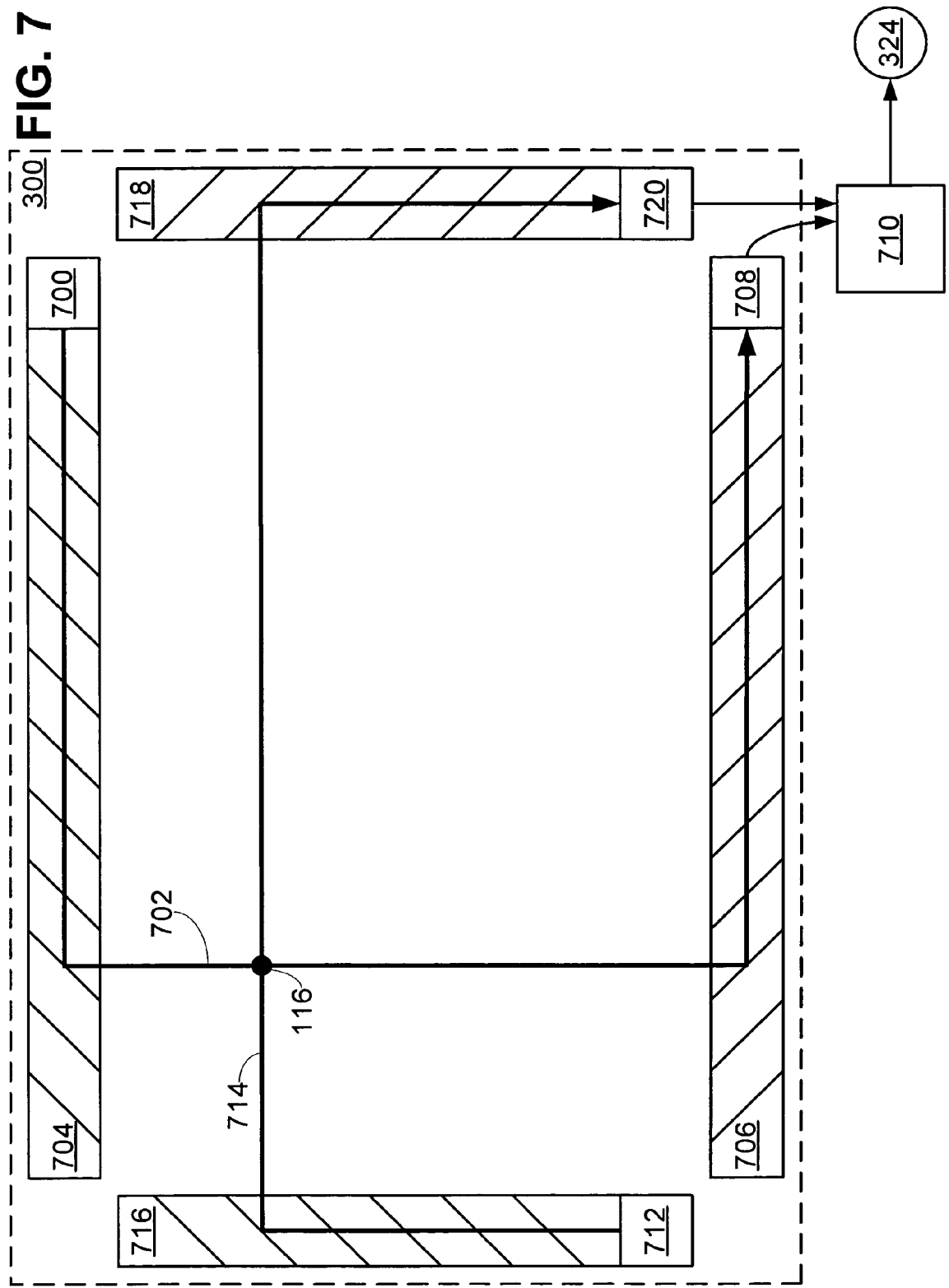

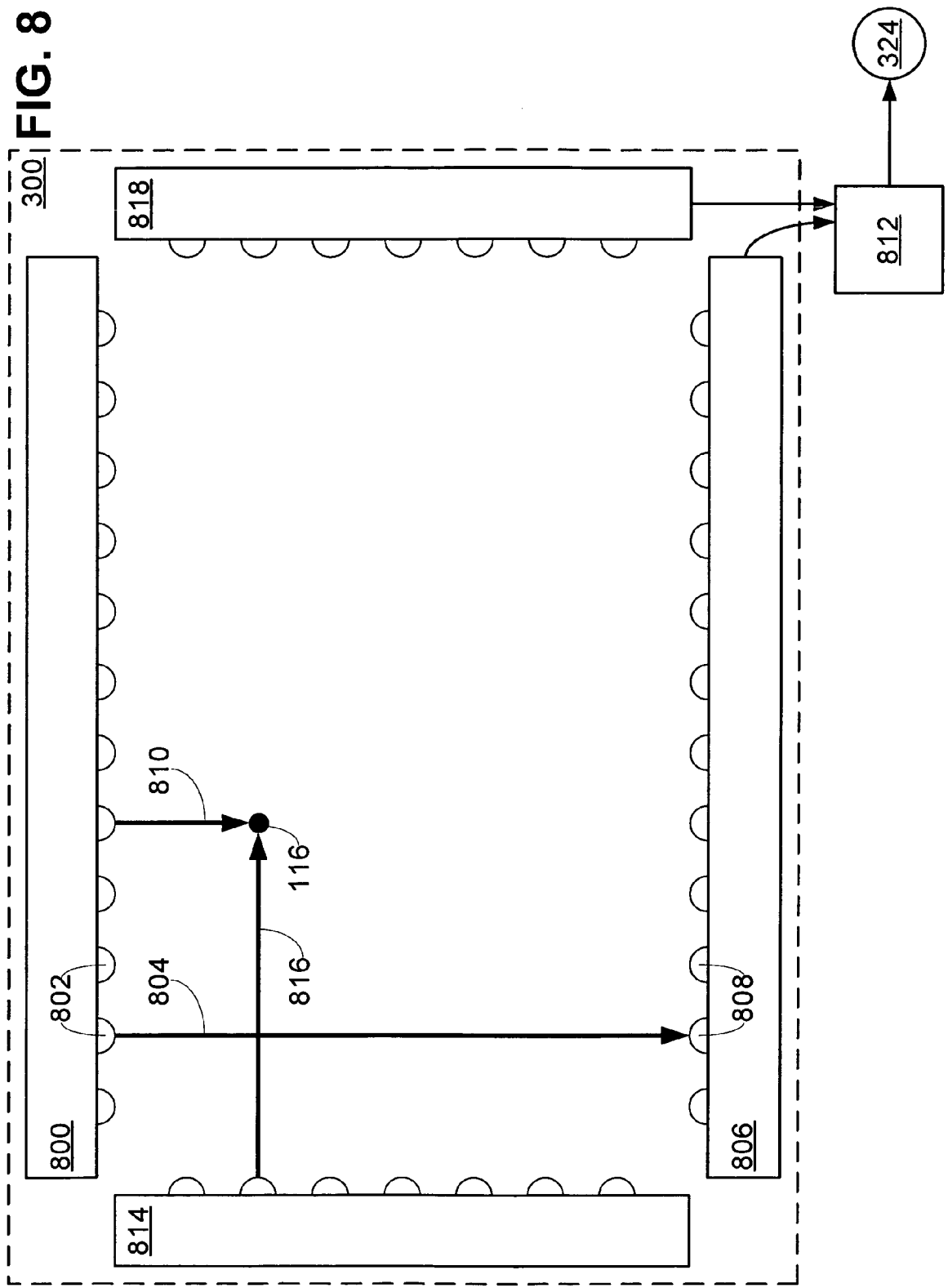

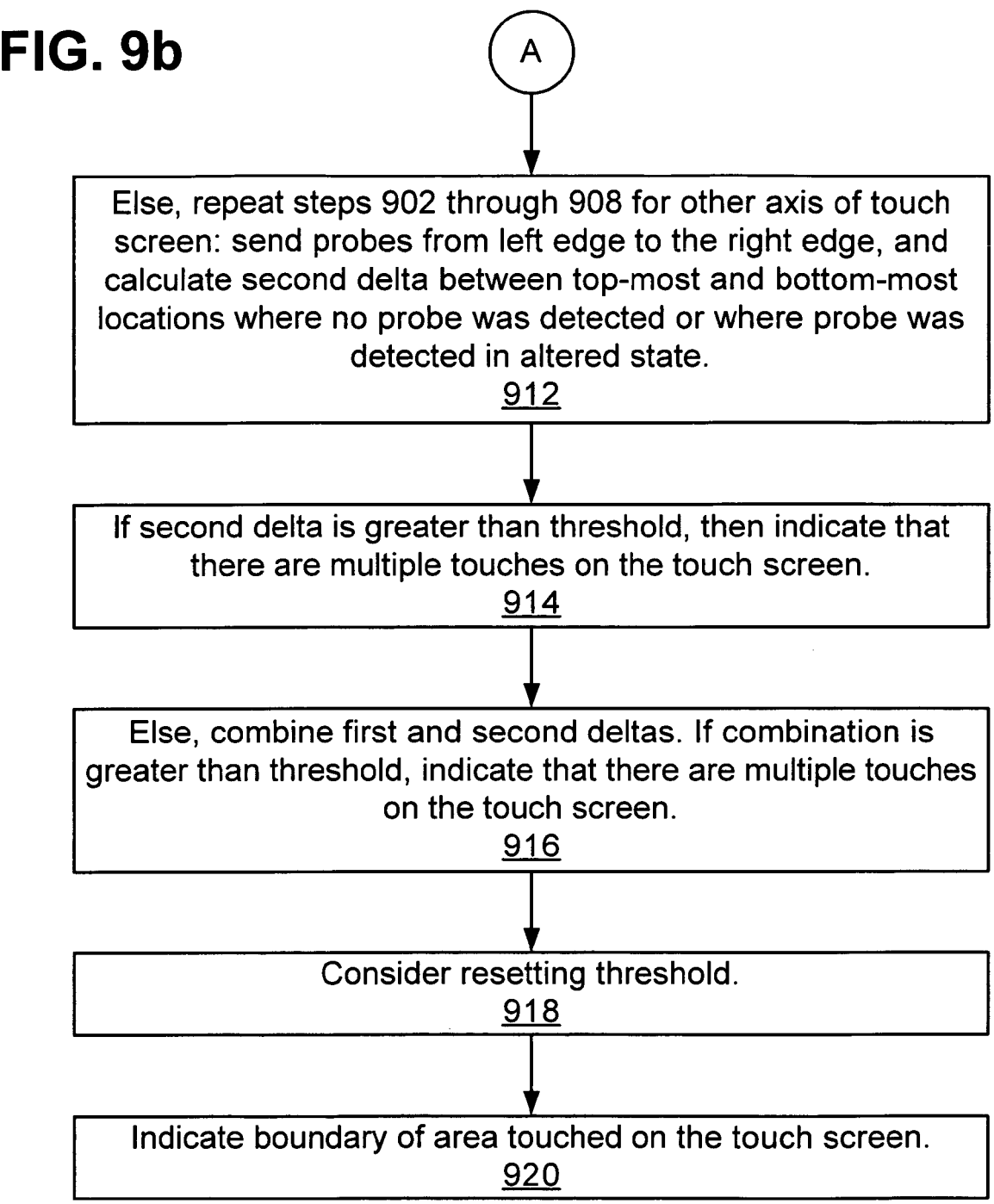

METHOD AND SYSTEM FOR DETECTING MULTIPLE TOUCHES ON A TOUCH-SENSITIVE SCREEN

Related Application

This application is a divisional of the coassigned and copending U.S. patent application 10/185,056, filed on Jun. 28, 2002 now U.S. Pat. No. 7,023,427, and entitled "Method and System for Detecting Multiple Touches on a Touch-Sensitive Screen." Priority is hereby claimed to this case under 35 U.S.C. §120.

TECHNICAL FIELD

The present invention is related generally to touch-sensitive screens, and, more particularly, to detecting multiple touches on a touch-sensitive screen.

BACKGROUND OF THE INVENTION

Recently, portable computing devices that support some form of data entry have become common. Such devices include, for example, cellular telephones, two-way pagers, and personal digital assistants. Often, these devices include a touch-sensitive display screen that serves both to display output from the computing device to its user and to receive input from the user. For some applications, the user "writes" with a stylus on the screen. The user's handwriting is decoded and becomes input to the computing device. In other applications, the user's input options are displayed as control icons on the screen. When the user selects an option by touching the icon associated with the option, the computing device detects the location of the touch and sends a message to the application or utility that presented the icon. To enter text, a "virtual keyboard," typically a set of icons that look like the keycaps of a traditional keyboard, are painted on the screen. The user "types" by successively touching areas on the screen associated with specific keycap icons.

All of these input modes have at least one thing in common: they assume that the touch-sensitive screen is touched at only one point at a time. Indeed, these screens are designed with this assumption in mind. When a user accidentally touches the screen at more than one point (for example, by hitting two "virtual keys" at the same time), these screens become confused and either capture neither touch or, assuming a single touch, compute a location of the assumed single touch that is some confusing combination of the locations of the multiple touches. Either case confuses the user, and the latter case may result in unwanted input being sent to an application reading the screen.

The problem of accidentally touching more than one location at a time has existed at least since the introduction of the typewriter keyboard in the nineteenth century. Somewhat alleviating the problem, a user of a physical keyboard can usually tell by feel that he has hit more than one key. Unlike these physical keyboards, however, touch-sensitive screens are so rigid and have essentially no "give" that they cannot provide tactile feedback to tell the user that he is touching the screen at more than one location.

While multiple touches present a problem with the small touch-sensitive screens already in common use, the problem is expected to worsen as larger screens are introduced. This is due to the "palm rest problem." When using a small screen only a few inches wide, the palm of the user's hand rests, if anywhere, beyond the edge of the screen on the periphery of the computing device. With a larger screen, when a right-handed user selects an area on the left side of the screen, for example, it is natural for him to rest his right palm below and to the right of the selected point. This palm rest becomes a secondary touch on the screen, confusing it as described above.

As one interesting scenario for the multiple-touch problem, consider a recently introduced tablet-like detachable monitor supported by a host computing device. The host is typically a personal computer (PC) sitting in a fixed location. The tablet has a large (eight or more inches wide) touch-sensitive display screen. The tablet, once detached from the host, communicates wirelessly with the host and operates as a portable input/output device. A user carries the tablet around an office or home, using the tablet to gain access to applications running on the fixed-location host. For at least two reasons, the multiple-touch problem is a matter of special concern for users of this tablet. First, some of the host-supported applications, for example e-mail, word processing, and Web browsing, require extended text entry. To accommodate this, the tablet presents a virtual keyboard. However, as described above, their lack of tactile feedback makes virtual keyboards inherently susceptible to multiple touches. Second, the large size of the screen and the fact that the tablet often rests in a user's lap invite the user to rest his hands on it.

What is needed is way to detect multiple touches on a touch-sensitive screen. Ideally, the multiple touches can be individually resolved, the correct one determined and acted upon, and the others discarded.

SUMMARY OF THE INVENTION

In view of the foregoing, the present invention provides a method and a system for detecting multiple, simultaneous touches on a touch-sensitive screen of a computing device. The details of the method differ with differing touch-screen technologies. In general, the hardware that controls the touch screen performs two measurements to locate a touch location on the screen. If there is a single touch, then the two measurements are equal. A non-zero difference indicates multiple touches and is, correlated with the spread of locations simultaneously touched on the screen. If the difference is greater than a set threshold, then an indication is given of multiple touches. In some embodiments, the indication is given by the touch-screen controller to the operating system of the computing device. The operating system then warns the user against multiple touches and ignores input from the screen as long as multiple touches are detected. Some warnings take the form of messages posted to the screen while others are audible alerts.

The threshold for detecting multiple touches can vary to match requirements set by an application configured to accept input from the touch-sensitive screen. The threshold can also be set based upon the size of a stylus, or a finger, currently in use.

For some embodiments, when multiple touches are detected, the invention also tries to indicate the boundary of the set of locations simultaneously touched. For example, the edges of a rectangle enclosing all of the touches are detected and provided. The boundary is used to interpolate the intended single touch from the locations of all the touches. For example, if a right-handed user is writing with a stylus, then the upper-left corner of the boundary may represent the intended single touch, that is, the location of the stylus in the user's hand. The remaining contact points are taken to be the user's right palm resting on the screen.

The upper-left corner of the boundary is taken as the proper input point while the remainder of the contact locations are ignored.

In some embodiments, the touch-screen controller is enhanced to provide the multiple measurements used in detecting multiple touches. The details of these enhancements differ with the technology of the touch-sensitive screen.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 1 is a block diagram showing an exemplary computing environment with a touch-sensitive display screen and also illustrating the "palm rest problem";

FIG. 2a is a schematic diagram generally illustrating an exemplary computing system that supports the present invention and FIG. 2b is a schematic diagram showing an exemplary software environment for a portable tablet that supports the present invention;

FIGS. 3a through 3c illustrate the workings of a generalized resistive touch screen, FIG. 3a is a schematic diagram showing top and bottom edge conductors, FIG. 3b is a schematic diagram showing left and right edge conductors, and FIG. 3c is a circuit diagram showing an electrical circuit equivalent to the resistive touch screen when there is one touch on the screen;

FIGS. 4a through 4c illustrate the problem that arises when there are multiple touches on a resistive touch screen, FIG. 4a is a schematic diagram showing the top and bottom edge conductors, FIG. 4b is a schematic diagram showing the left and right edge conductors, and FIG. 4c is a circuit diagram showing an electrical circuit equivalent to the resistive touch screen when there are two touches on the screen;

FIGS. 6a and 6b together form a flowchart showing an exemplary method according to the present invention for detecting multiple touches on a resistive touch screen;

FIG. 7 is a schematic diagram illustrating the workings of an SAW (Surface Acoustic Wave) touch screen;

FIG. 8 is a schematic diagram illustrating the workings of an optical (infrared) touch screen;

FIGS. 9a and 9b together form a flowchart showing an exemplary method according to the present invention for detecting multiple touches on an SAW or optical touch screen.

DETAILED DESCRIPTION OF THE INVENTION

Figure 2A:
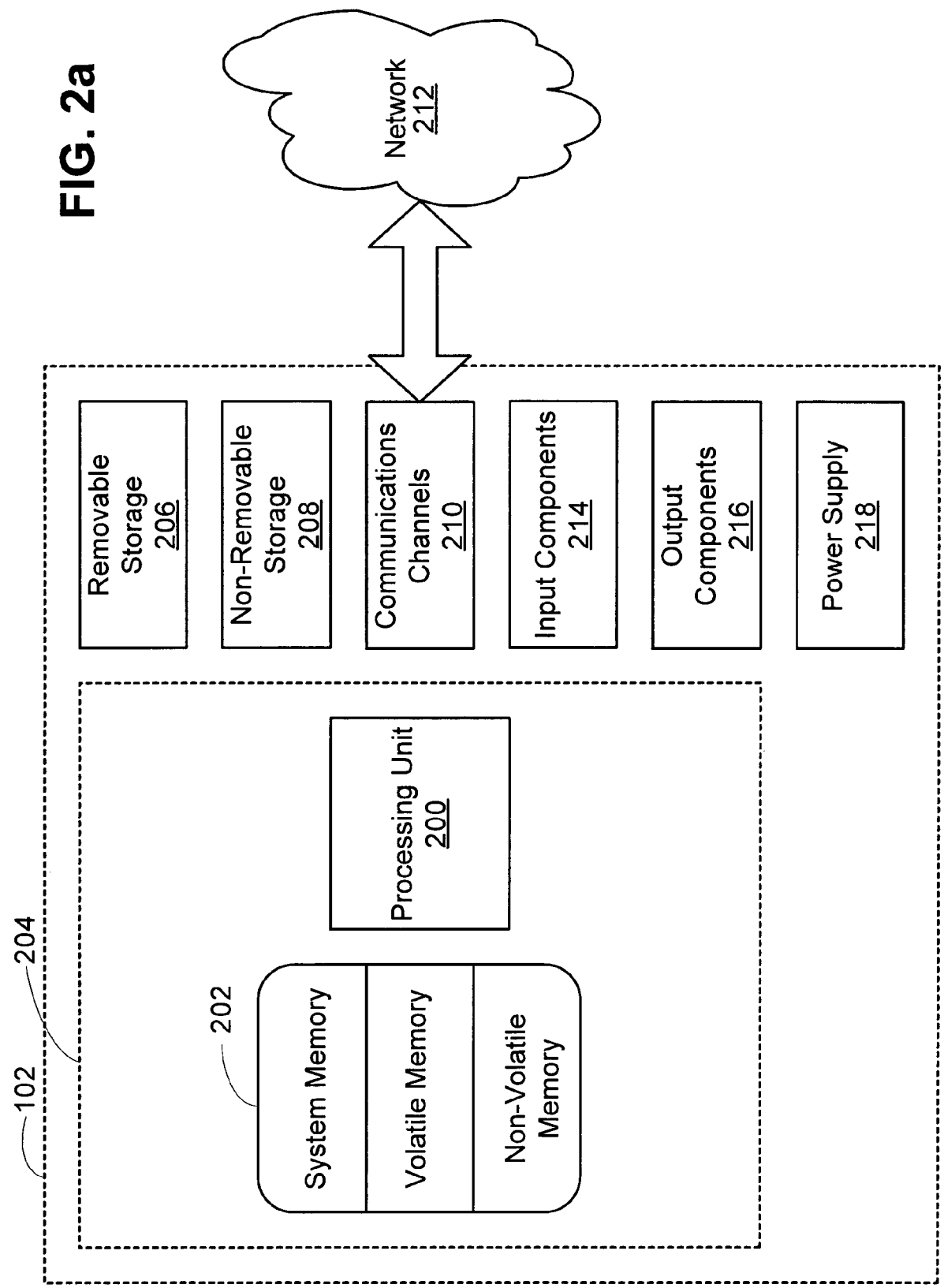

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

FIG. 1 presents an example of a computing environment with a touch-sensitive display screen. Note that while display screens are used to illustrate this discussion, the present invention is usable with touch-sensitive screens whether or not those screens also incorporate a display. In FIG. 1, a portable, interactive display device or "tablet" 100 communicates with a host computing device 102 via a wireless communications channel, here illustrated by a radio antenna 104 on the portable tablet 100 and by another antenna 106 on the host 102. By means of its touch screen, the portable tablet 100 presents to its user a graphical user interface of the host 102. The user sends input to the host 102 by touching the touch screen with a stylus 108 or with a finger. The portable tablet 100 may support other input and output peripherals (not shown) including a mouse, speaker, camera, and the like. The portable tablet 100 is of the type disclosed in U.S. patent application Ser. No. 09/784,716, "Methods and Systems for a Portable, Interactive Display Device for Use with a Computer," which is incorporated herein by reference in its entirety.

By touching the stylus 108 against the touch-sensitive display screen of the portable tablet 100, the user selects the location marked 116 on the touch screen. If the location 116 were the only location touched on the touch screen, then a message indicating the selection of that location 116 would be sent to the application or utility responsible for that portion of the touch screen. In the illustration of FIG. 1, however, a second area is touched on the touch screen. The palm of the user's hand (not shown) is resting on the touch screen creating the touched area 118. That second touch 118 would confuse a traditional touch screen, as it is designed to detect only one touch at a time. The present invention allows a touch screen to detect multiple simultaneous touches and to respond to them appropriately.

The host computing device 102 is separate from the portable tablet 100 and usually sits in a fixed location. The host 102 may support any number of peripherals, here illustrated by a hardware keyboard 112 and by a mouse 114 attached to the host by a wired communications channel. The host 102 provides storage space, access to its own peripheral devices, and processing to run applications. The portable tablet 100 need only provide the amount of processing necessary to communicate with the host 102, to run the client side of the hosting software, and to provide security functions.

The portable tablet 100 operates in two modes: untethered, as described above, and tethered. The untethered mode is limited by the bandwidth and range of the wireless communications channel. The host computing device 102 provides a docking station 110 that accommodates the portable tablet 100. When in the docking station, the portable tablet 100 switches to tethered mode. In this mode, the portable tablet 100 operates as a display for the host 102 and communicates with the host 102 through connectors on the docking station 112 rather than through the wireless channel. This allows for a higher quality video connection. In FIG. 1, the docking station 110's connection to the host 102 is by way of a wired communications channel. Other communications options are possible. The docking station 110 may provide power to run the portable tablet 100 and to recharge its batteries.

The portable tablet 100 and the host computing device 102 of FIG. 1 may be of any architecture. FIG. 2*a* is a block diagram generally illustrating an exemplary computer system that supports the present invention. The computer system of FIG. 2*a* is only one example of a suitable environment and is not intended to suggest any limitation as to the scope of use or functionality of the invention. Neither should the portable tablet 100 or the host 102 be interpreted as having any dependency or requirement relating to any one or combination of components illustrated in FIG. 2*a*. The invention is operational with numerous other general-purpose or special-purpose computing environments or configurations. Examples of well known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs, minicomputers, mainframe computers, and distributed computing environments that include any of the above systems or devices. In their most basic configurations, the portable tablet 100 and the host 102 typically include at least one processing unit 200 and memory 202. The memory 202 may be volatile (such as RAM), non-volatile (such as ROM or flash memory), or some combination of the two. This most basic configuration is illustrated in FIG. 2*a* by the dashed line 204. The portable tablet 100 and the host 102 may have additional features and functionality. For example, they may include additional storage (removable and non-removable) including, but not limited to, magnetic and optical disks and tape. Such additional storage is illustrated in FIG. 2*a* by removable storage 206 and by non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the portable tablet 100 or by the host 102. Any such computer-storage media may be part of the portable tablet 100 or of the host 102. The portable tablet 100 and the host 102 may also contain communications channels 210 that allow them to communicate with other devices, including devices on a network 212. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include optical media, wired media, such as wired networks and direct-wired connections, and wireless media such as acoustic, RF, infrared, and other wireless media. The term "computer-readable media" as used herein includes both storage media and communications media. The portable tablet 100 and the host 102 may also have input devices 214 such as a touch-sensitive display screen, a stylus 108, a hardware keyboard 112, a mouse 114, a voice-input device, etc. Output devices 216 include the devices themselves, such as the touch-sensitive display screen, speakers, and a printer, and rendering modules (often called "adapters") for driving these devices. All these devices are well know in the art and need not be discussed at length here. The portable tablet 100 and the host 102 each has a power supply 218. On the portable tablet 100, the power supply 218 includes a battery and may include circuitry for recharging the battery whenever the portable tablet 100 is in the docking station 110.

When operating in untethered mode, the portable tablet 100 is supported by software that projects the user interface of the host computing device 102 to the portable tablet 100. The software also accepts user input from the portable tablet 100 and sends it to the host 102. As an example of this software, FIG. 2*b* is a block diagram of Microsoft's "WINDOWS TERMINAL SERVICES." An application program 220 running on the host 102 sends its output to the operating system 224 intending that the output be displayed in one or more windows managed by the Desktop 222. If the user of the application program 220 is using a portable tablet 100, however, the Terminal Services software component 226 intercepts the display output, reformats it, and delivers it to the Networking software component 228 for transport to the portable tablet 100. The display information is transported to the portable tablet 100 by a standard protocol such as Microsoft's Remote Desktop Protocol 230 or by the Independent Computing Architecture protocol. These protocols allocate the limited bandwidth of the wireless communications channel, an especially important consideration when a bandwidth-intensive peripheral, such as a camera, is attached to the portable tablet 100. When the display information reaches the Networking component 232 on the portable tablet 100, it is passed to the Terminal Services Client component 236. That component interprets the information and displays it on the touch-sensitive display screen of the portable tablet 100. This procedure is reversed for input generated on the portable tablet 100, such as by use of the stylus 108. The user input is presented to the application program 220 as if it were generated locally on the host 102. Note that FIG. 2*b* is for illustrative purposes only, and the invention is not limited to the specific software components and protocols shown. In particular, the portable tablet 100 may run an operating system entirely different from that of the host 102. The standard display protocol hides implementation differences. The protocols and transport methods used to carry the display information are chosen to suit particular needs. For example, protocols TCP/IP, SPX, IPX, and NetBEUI may each be appropriate in certain situations. Appropriate transport methods include infrared and short-range radio such as Bluetooth, IEEE's 802.11b, and IEEE 1394 Firewire.

Typically, a touch-sensitive display screen is made up of a touch-sensor component constructed over a display component. The display component displays images in a manner similar to that of a typical monitor on a personal computer. A portable tablet 100 would probably use a liquid crystal display because of that display's low weight and small depth. Other display technologies are possible such as, for example, cathode ray tubes, plasma screens, electro-luminescent screens, and organic light-emitting diodes.

The touch sensor sits on top of the display component. The touch sensor is transparent so that the display may be seen through it. Many touch-sensor technologies are known in the art, including four-, five-, and eight-wire resistive, capacitive, near field, optical, and acoustic wave. The discussion of FIGS. 3 through 9 illustrates the workings of the present invention with selected exemplary touch-sensor technologies.

A first exemplary touch-sensor technology, resistive, is illustrated in FIGS. 3a through 3c. The touch sensor is made up of two thin conductive surfaces, one atop the other and normally separated from one another by tiny separator "dots." Pressure on the touch sensor causes the two conductive surfaces to touch one another. FIGS. 3a and 3b each shows one of the two conductive surfaces of a touch screen 300. FIG. 3c shows an electrical circuit that is the equivalent of the touch screen 300 when touched at one location 116.

Conductors (302 and 304 in FIG. 3a and 310 and 312 in FIG. 3b) are attached to opposite edges of each conductive surface. First consider how the location of a single touch is detected. Detection is performed one coordinate axis at a time. To detect the vertical coordinate of the touch 116, the top-edge conductor 302 of the first conductive surface is set, via lead 306, to a reference voltage 318 (of FIG. 3c). The bottom-edge conductor 304 is grounded via lead 308. The edge conductors 310 and 312 of the second conductive surface are connected, via leads 314, 316, and 322, to a voltage measurement circuit 320.

Referring to the equivalent electrical circuit of FIG. 3c, R1+R2 is the total resistance between the top-edge conductor 302 and the bottom-edge conductor 304 of the first conductive surface. As each conductive surface has a uniform linear resistivity, the touch 116 divides this total resistance R1+R2 proportionally to the touch 116's distance from the bottom-edge conductor 304. R3 is the resistance between the two conductive surfaces at the touch 116. Current flows along the first conductive surface from the top-edge conductor 302 to the touch 116 where it flows into the second conductive surface. The current then flows to the two edge conductors 310 and 312 of the second conductive surface. R4+R5 is the total resistance between the left-edge 310 and right-edge 312 conductors. R4 is the resistance between the touch 116 and the left-edge conductor 310, and R5 is the resistance between the touch 116 and the right-edge conductor 312. The internal impedance of the voltage measurement circuit 320 is set high enough so that R3, R4, and R5 may be ignored. When $V_{source}$ is the reference voltage 318, the measured voltage, $V_{sense}$, is:

$V_{sense} = V_{source} * (R2/(R1+R2))$ so that $R2/(R1+R2) = V_{sense}/V_{source}$.

Thus, the measured voltage is proportional to the distance of the touch 116 from the bottom-edge conductor 304. This proportion is converted into a vertical coordinate of the touch 116.

The horizontal coordinate of the touch 116 is measured by exchanging the roles of the two conductive surfaces. The second conductive surface's left-edge conductor 310 is set to the reference voltage 318 while the right-edge conductor 312 is grounded. The first conductive surface's top-edge 302 and bottom-edge 304 conductors are then connected to the voltage measurement circuit 320. The measured voltage is proportional to the distance of the touch 116 from the right-edge conductor 312 and is converted to a horizontal coordinate.

The vertical and horizontal coordinates of the touch 116 are sent as output 324. The operating system 234 of the tablet 100 sends a message indicating the coordinates to an appropriate application program 220 or to an operating system utility, whichever is responsible for the area of the touch screen 300 that includes the touch 116.

Next consider FIGS. 4a through 4c and the problem of two simultaneous touches on a traditional touch screen 300. When a second touch 118 is added to the first touch 116, the equivalent electrical circuit is as shown in FIG. 4c. R10 is the resistance between the top-edge conductor 302 of the first conductive surface and the upper touch (116 in this example), R11 is the vertical resistance between the two touches, and R12 is the resistance between the lower touch (118) and the bottom-edge conductor 304. R16 is the resistance between the first and second conductive surfaces at the touch 116, and R17 is the resistance between the two conductive surfaces at the touch 118. R13 is the resistance between the left-edge conductor 310 of the second conductive surface and the left touch (116), R14 is the horizontal resistance between the two touches, and R15 is the resistance between the right touch (118) and the right-edge conductor 312.

Without the present invention, the touch screen 300 assumes that there is only one touch and attempts to measure that touch's location in the same way as described with respect to FIGS. 3a through 3c. However, when the touch screen 300 attempts to measure the vertical coordinate of the assumed single touch, the current flowing between the two touches 116 and 118 confuses its measurement. As can be seen by examining the equivalent circuit of FIG. 4c, the voltage at the measurement circuit 320 depends upon the horizontal and vertical separations of the two touches 116 and 118 and also upon the internal characteristics of the measurement circuit 320 itself. The coordinates produced in the output 324 are confusing or useless. The situation is made no better when the number of touches exceeds the two shown in FIGS. 4a through 4c.

Figure 5:
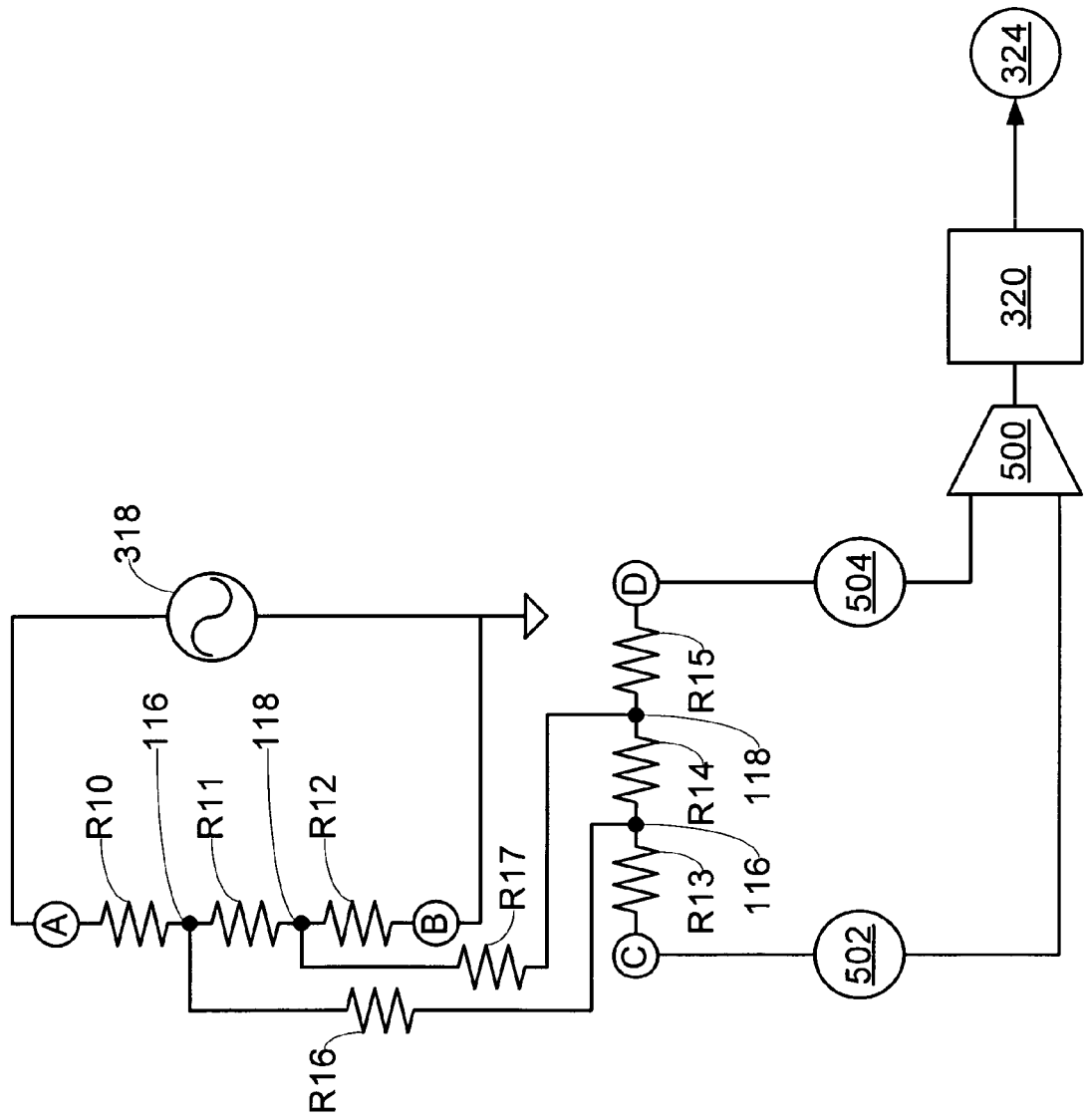
FIG. 5 is a schematic diagram of a circuit that permits the detection of multiple touches on a resistive touch screen.
Figure 6B:
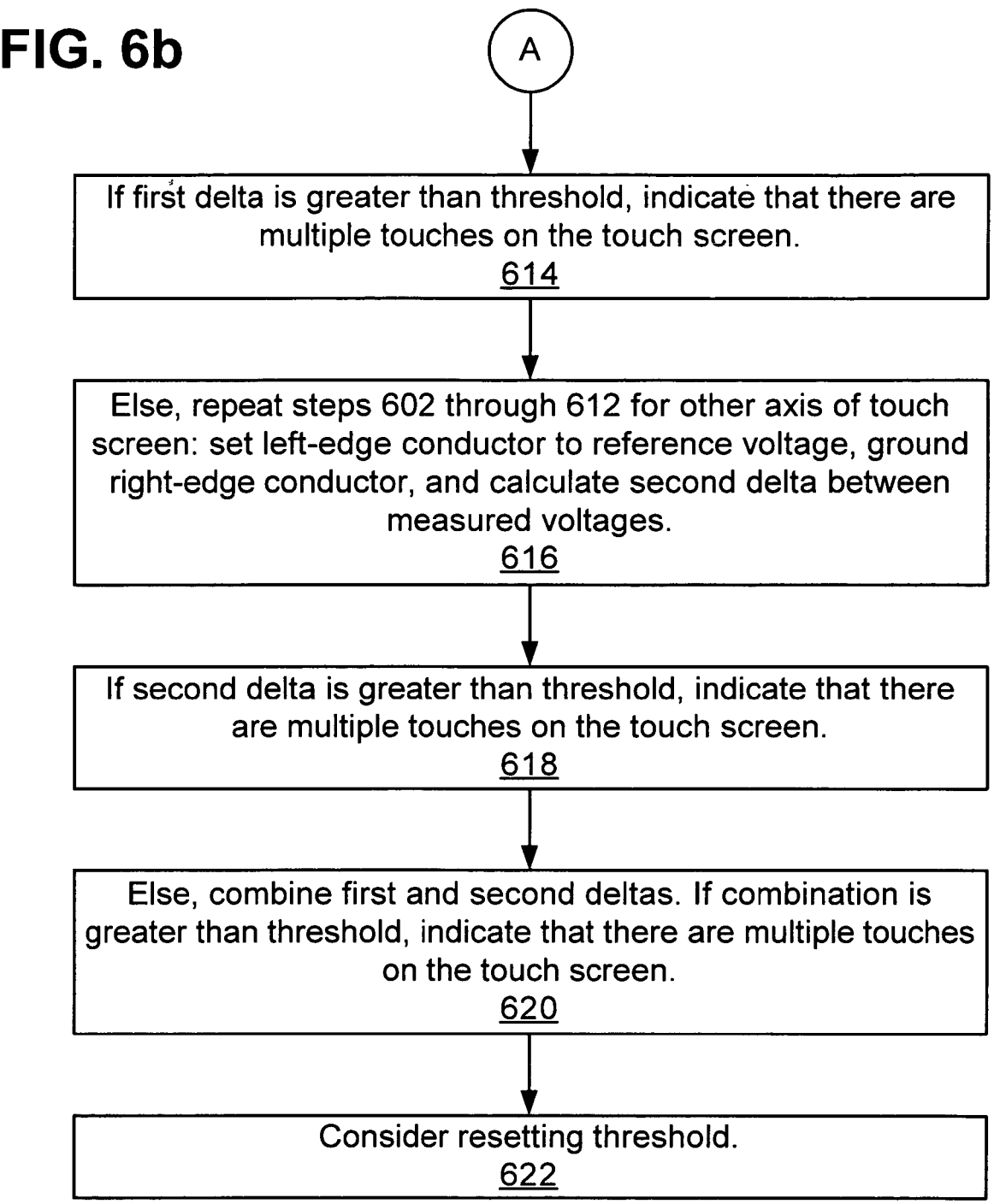

Using the same two touches 116 and 118 as in FIGS. 4a through 4c, FIG. 5 presents an equivalent circuit according to the present invention that addresses the multiple-touch problem. According to one embodiment, the measurement circuit 320's single lead 322 is replaced in FIG. 5 with two measurement points 502 and 504 and a switch or multiplexor 500. This new arrangement allows the measurement circuit 320 to distinguish a single touch from a set of two or more touches. In conjunction with FIG. 5, FIGS. 6a and 6b present a flow chart of the operation of an exemplary embodiment of the present invention.

In step 600 of FIG. 6a, a multiple contact point discrimination threshold is set. This threshold determines how far apart two touches can be and still be considered as one touch. The use of this threshold and the considerations that go into setting its value are discussed below.

Step 602 follows the procedure of FIGS. 3a through 3c to configure the conductive surfaces in order to measure the vertical coordinate(s) of the location(s) touched on the touch screen 300. In step 604, the multiplexor 500 connects the measurement circuit 320 to one of the two measurement points 502. A first voltage measurement is then taken in step 606.

The multiplexor 500 then connects the measurement circuit 320 to the second measurement point 504 in step 608, and a second voltage measurement is taken in step 610. In step 612, a first delta between the first and second voltage measurements is calculated.

By referring to the equivalent circuit of FIG. 5, it can be seen that this first delta is zero when R14 is zero, that is, when there is no horizontal separation between the two touches 116 and 118. By comparing this circuit with the circuit of FIG. 3c, it can also be seen that when only one touch is present, the one voltage measured in steps 606 and 610 of FIG. 6a is the same as the voltage measured in FIG. 3c. Thus, adding the multiplexor 500 and the two measurement points 502 and 504 does not affect the operation of the touch screen 300 when only one touch is present. If, on the other hand, the first delta is non-zero, then there is some horizontal separation between the touches 116 and 118 which means that multiple contact points have been detected.

In step 614, the first delta is compared to the multiple contact point discrimination threshold set in step 600. The threshold determines how large a separation of touches will still be reported as a single touch. Keeping the threshold value above zero is important as even a stylus may simultaneously produce multiple touches in a small area. It is helpful to simply consider a closely grouped set of touches as a single touch. Electrical noise and temperature-based variations in the response of the touch screen 300 may also confusingly appear as multiple touches if the threshold is set too low. If the first delta exceeds the threshold, then an indication is sent in the output 324 that multiple touches have been detected.

Strictly speaking, step 614 is optional. This is because only one coordinate has been measured so far. Some embodiments wait and make the comparison with the threshold in step 620 after both coordinates have been measured.

Steps 616 and 618 repeat steps 602 through 614 for the other coordinate axis of the touch screen 300. In some embodiments, step 618 is omitted, and the two deltas are combined in step 620. As the two deltas represent separations on two coordinate axes, the combination is conceptually geometric. The combination is compared against the multiple contact point discrimination threshold.

Whether the deltas are compared against the multiple contact point discrimination threshold separately in steps 614 and 618 or together in step 620, when multiple touches are detected, that fact is reported in the output 324. An example of what can be done with that indication is discussed below in reference to FIG. 10. In step 622, the recent history of the output 324 is considered. If multiple touches are being reported very frequently, then it may be the case that the user is resting his palm on the touch screen 300. However, it may also be the case that the threshold is set too low. Raising the threshold may solve the problem and prevent repeatedly annoying a user who is simply pressing a little vigorously with a stylus 108.

Resistive touch-screen technology is used to illustrate the discussion accompanying FIGS. 5 and 6. The invention is not limited to resistive touch screens so before proceeding to FIG. 10 example of how to respond to an indication of multiple contact points, consider the operation of the present invention with two other representative touch-screen technologies.

FIG. 7 depicts the workings of a Surface Acoustic Wave (SAW) touch screen 300. To detect the horizontal coordinate of a touch 116, a transducer 700 emits an acoustic wave 702 inaudible to the human ear. The acoustic wave 702 starts traveling toward the left of the SAW touch screen 300 but is deflected by a series of reflectors in an array 704. The reflectors cause the wave 702 to take the shape of a vertical wave front moving to the left. On the opposite side of the SAW touch screen 300, another reflector array 706 deflects the wave front 702 to a receiver 708. As the wave front 702 crosses the surface of the SAW touch screen 300, if it encounters an obstacle touching the SAW touch screen 300 (as illustrated at touch 116), the wave front 702 is somewhat altered. The amplitude of the wave front 702 may be reduced, its frequency may be shifted, or the wave front 702 may be entirely blocked from reaching the reflector array 706 at that point.

The first part of the wave front 702 that reaches the receiver 708 must have traveled the shortest distance and so must have crossed the SAW touch screen 300 at its rightmost edge. Later and later parts of the wave front 702 cross the SAW touch screen 300 at positions farther and farther to the left. Because the receiver 708 is time-coordinated with the transducer 700, the measurement circuit can use the time of arrival of an alteration in the incoming wave front 702 to calculate the horizontal location of the touch 116 that altered the wave front 702. The measurement circuit 710 is also connected to a set of another transducer 712, reflector arrays 716 and 718, and receiver 720 to calculate the vertical coordinate of the touch 116. The vertical and horizontal coordinates are indicated in the output 324.

Figure 9A:
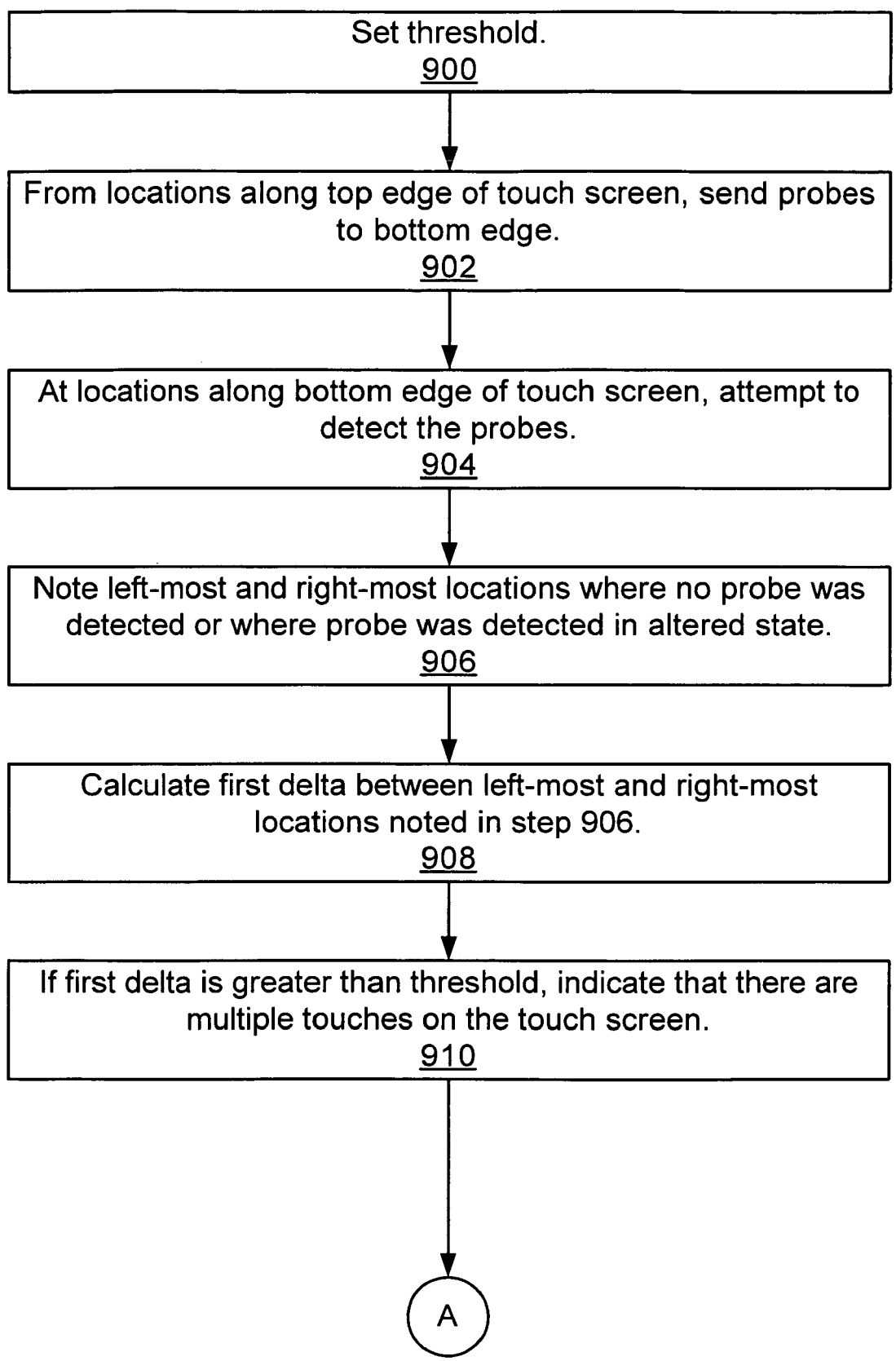

Before proceeding to FIGS. 9a and 9b that present an exemplary embodiment of the present invention that works with the SAW touch screen 300 of FIG. 7, consider one more touch-screen technology, the optical touch screen 300 of FIG. 8. In some sense, optical touch-screen technology is the easiest to understand. Emitters 802 in an array 800 send light beams 804 (usually infrared) across the optical touch screen 300 to an array 806 of detectors 808. If a light beam is blocked by an obstacle, such as light beam 810 that is blocked at touch 116, then the detector 808 notes the absence of the beam and reports it. The same method is used for the vertical coordinate using an emitter array 814 and a detector array 818. The measurement circuit 812 indicates the coordinates of the blocked beams, that is, the coordinates of the touch 116, in output 324.

The embodiment of the invention described in the flow chart of FIGS. 9a and 9b works with both SAW and optical touch screens. The multiple contact point discrimination threshold set in step 900 has the same meaning as the threshold discussed above in reference to FIGS. 6a and 6b and is set with the same considerations in mind. However, the units of the threshold vary depending upon exactly what is being measured in each touch-screen technology. For example, the measurement circuit 320 of the resistive touch screen of FIGS. 3 through 6 measures voltage while the measurement circuit 712 of FIG. 7's SAW touch screen measures time.

In step 902, "probes" are launched from the top edge of the touch screen 300 to search for touches. In step 904, attempts are made to detect the probes on the bottom edge. For the SAW touch-screen technology, these "probes" are the set of waves that together make up the traveling wave front 702. For optical touch-screen technology, these probes are the light beams 804.

If a probe reaches a detector in an altered state or does not reach the detector at all, then a touch has been detected, and the horizontal coordinate of the touch is stored in step 906. A note is made of the left-most and right-most touch locations. The distance between the left-most and right-most touch locations is calculated as the first delta in step 908.

As in step 614 of FIG. 6b, in some embodiments this first delta is compared against the multiple contact point discrimination threshold in step 910. Other embodiments wait until both coordinate axes are measured.

Steps 912 and 914 repeat steps 902 to 910 to measure the vertical distance between the touches. In some embodiments, the horizontal and vertical distances are combined in step 916 and compared with the multiple contact point discrimination threshold. As in the discussion of step 620 of FIG. 6b, if the combination of the deltas exceeds the multiple contact point discrimination threshold, then an indication is given of the presence of multiple contact points. As discussed in reference to step 622 of FIG. 6b, the threshold may need to be changed if multiple touches are being detected too frequently.

Step 920 takes advantage of a characteristic of SAW and optical touch screens. These technologies can locate the boundary of a region containing all of the detected touches. From a glance at FIGS. 7 and 8, it is clear that the measurement circuits can report the left-most, right-most, top-most, and bottom-most touch locations (recorded in steps 906 and 912). This information is sent along with the indication that multiple touches are present.

Figure 10:
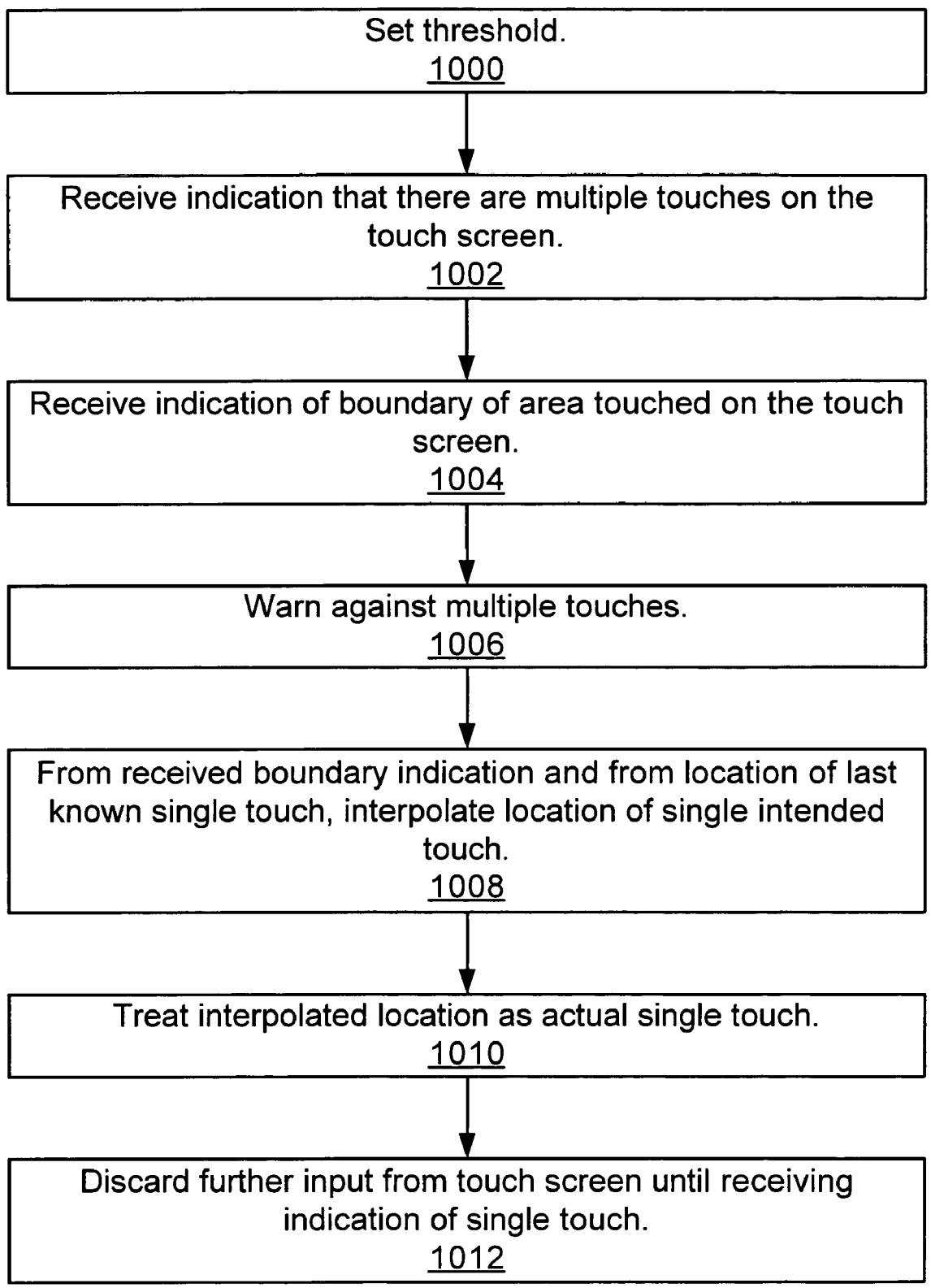
FIG. 10 is a flowchart showing an exemplary method according to the present invention for responding to an indication of multiple touches on a touch-sensitive screen.

Until this point, the present discussion focuses on detecting and reporting multiple touches. Finally, FIG. 10 is an exemplary method of what can be done when multiple touches are detected. Note that some of the steps of FIG. 10 may advantageously be performed in the operating system 234 of the portable tablet 100 while other steps may advantageously be performed in an application program 220.

The multiple contact point discrimination threshold is set in step 1000. An indication of multiple touches is received in step 1002, accompanied, in some embodiments, with an indication of the boundary of the touched area in step 1004.

A usual response to the multiple touch indication is to warn the user against multiple touches in step 1006. The warning may take many forms and will, it is hoped, help the user learn to properly position his hands when using the touch screen 300.

A second response is possible when touch boundary information is received in step 1004. In that case, in step 1008 the location of a single intended touch may sometimes be interpolated. For example, if very recently (less than a second ago), a single touch location was detected, and if the upper left corner of the touch boundary now indicated closely matches that single touch location, and if the lower right corner of the boundary is a few inches from that single touch location, then the user may well be right handed, is writing with a stylus, and just rested his right palm on the touch screen 300. In some situations, the upper-left corner of the boundary may safely be taken as the intended single touch location and treated as such in step 1010. Other interpolation scenarios are also possible and may depend upon configuration or other information about the touch screen 300, about the user, and about the computing environment.

If no boundary information is available, or if interpolation has gone on too long to expect reasonable accuracy in the interpolation, then in step 1012 further input from the touch screen 300 is discarded. With the touch screen 300 no longer responding and with the warning from step 1006, it is expected that the user will quickly eliminate the multiple touches. Once the touch screen 300 again indicates a single touch, the input from the touch screen 300 can be accepted as before.

The present invention is not meant to be limited to the examples of touch-screen technology discussed above. In general, wherever there are at least two ways to measure the location of a touch on a touch-sensitive screen 300, and where those two ways yield the same result when there is only one touch present, and where those two ways yield different results when multiple touches are present, the present invention is applicable.

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that some implementation details, particularly details specific to one touch-screen technology, are determined by specific situations and will vary from embodiment to embodiment. Although the invention is described in terms of software modules or components, some processes may be equivalently performed by hardware components. Therefore, the invention as described herein contemplates all such embodiments as may come within the scope of the following claims and equivalents thereof.

We claim:

1. A computing system comprising a touch-sensitive screen, the computing system configured to, at least:
   set a multiple contact point discrimination threshold specifying, at least, a threshold distance between a first contact point and a second contact point;
   receive an indication that a set of simultaneous contact points on the touch-sensitive screen contains a plurality of contact points, the indication comprising a boundary of the set of simultaneous contact points;
   interpolate an interpolated contact point on the touch-sensitive screen from a former single contact point and from the indicated boundary;
   treat the interpolated contact point as a single contact point on the touch-sensitive screen; and
   discard input from the touch-sensitive screen until an indication is received that the set of simultaneous contact points on the touch-sensitive screen contains the single contact point.

2. The system of claim 1 wherein the multiple contact point discrimination threshold is set based upon a characteristic selected from the group consisting of: a type of program configured to receive input from the touch-sensitive screen and a type of physical stylus.

3. The system of claim 1 wherein the indication of the boundary comprises at least one value selected from the group consisting of: a leftmost contact point location, a rightmost contact point location, a topmost contact point location, and a bottommost contact point location.

4. The system of claim 1 wherein interpolating the interpolated contact point comprises selecting a top-left corner of the indicated boundary as the single contact point.

5. The system of claim 1 further comprising posting a warning against touching the touch-sensitive screen, the warning selected from the group consisting of: a visual warning displayed on the touch-sensitive screen and an audible warning.

6. The system of claim 1, wherein receiving each indication comprises receiving a message of a message protocol.

7. At least one computer-readable medium containing computer-executable instructions for performing, in a computing system comprising a touch-sensitive screen, a method for responding to an indication that a set of simultaneous contact points on the touch-sensitive screen contains a plurality of contact points, the method comprising:

setting a multiple contact point discrimination threshold specifying, at least, a threshold distance between a first contact point and a second contact point;

receiving an indication that a set of simultaneous contact points on the touch-sensitive screen contains a plurality of contact points, the indication comprising a boundary of the set of simultaneous contact points;

interpolating an interpolated contact point on the touch-sensitive screen from a former single contact point and from the indicated boundary;

treating the interpolated contact point as a single contact point on the touch-sensitive screen; and discarding input from the touch-sensitive screen until receiving an indication that the set of simultaneous contact points on the touch-sensitive screen contains the single contact point.

8. Said at least one computer-readable medium of claim 7, wherein the multiple contact point discrimination threshold is set based upon a characteristic selected from the group consisting of: a type of program configured to receive input from the touch-sensitive screen and a type of physical stylus.

9. Said at least one computer-readable medium of claim 7, wherein the indication of the boundary comprises at least one value selected from the group consisting of: a leftmost contact point location, a rightmost contact point location, a topmost contact point location, and a bottommost contact point location.

10. Said at least one computer-readable medium of claim 7, wherein interpolating the interpolated contact point comprises selecting a top-left corner of the indicated boundary as the single contact point.

11. Said at least one computer-readable medium of claim 7, wherein the method further comprises posting a warning against touching the touch-sensitive screen.

12. Said at least one computer-readable medium of claim 7, wherein receiving each indication comprises receiving a message of a message protocol.

13. A computer readable medium having a message protocol encoded thereon, the message protocol between a computing device comprising a touch-sensitive screen and a computing system, the message protocol comprising:

a message for setting a multiple contact point discrimination threshold specifying, at least, a threshold distance between a first contact point and a second contact point;

a message for indicating that a set of simultaneous contact points on the touch-sensitive screen contains a plurality of contact points, the indication comprising a boundary of the set of simultaneous contact points;

a message for indicating that a set of simultaneous contact points on the touch-sensitive screen contains a single contact point, the indication comprising the single contact point, the single contact point having been interpolated from a former single contact point and from the indicated boundary; and wherein each message of the message protocol causes at least one modification to data stored in the computer-readable medium of at least one of: the computing device and the computing system.

14. The message protocol of claim 13, wherein the computing system includes the computing device.

15. The message protocol of claim 13, wherein the threshold distance is set based upon a type of physical stylus and a type of program configured to receive input from the touch-sensitive screen.

16. The message protocol of claim 13, wherein the boundary comprises a rectangular boundary.

17. The message protocol of claim 16, wherein the rectangular boundary comprises at teast two of: a leftmost contact point, a rightmost contact point, a topmost contact point, and a bottommost contact point.

18. The message protocol of claim 16, wherein the former single contact point was indicated by a previous message.

19. The message protocol of claim 18, wherein interpolating the single contact point comprises selecting a top-left corner of the rectangular boundary.

20. The message protocol of claim 13, wherein, in response to at least one message of the message protocol, a warning against touching the touch-sensitive screen is posted.

\* \* \* \* \*